United States Patent
Um et al.

(10) Patent No.: US 9,891,826 B1
(45) Date of Patent: Feb. 13, 2018

(54) DISCARD COMMAND SUPPORT IN PARITY BASED REDUNDANT ARRAY OF FLASH MEMORY DISK

(71) Applicant: SK hynix memory solutions inc., San Jose, CA (US)

(72) Inventors: Tae Il Um, San Jose, CA (US); Hwansoo Han, Suwon (KR); Mehryar Rahmatian, San Jose, CA (US)

(73) Assignee: SK Hynix Inc., Gyeonggi-do (KR)

( * ) Notice: Subject to any disclaimer, the term of this patent is extended or adjusted under 35 U.S.C. 154(b) by 0 days.

(21) Appl. No.: 14/864,257

(22) Filed: Sep. 24, 2015

Related U.S. Application Data

(60) Provisional application No. 62/054,890, filed on Sep. 24, 2014.

(51) Int. Cl.
*G06F 12/00* (2006.01)
*G06F 3/06* (2006.01)
*G06F 12/10* (2016.01)

(52) U.S. Cl.
CPC .......... *G06F 3/0604* (2013.01); *G06F 3/0659* (2013.01); *G06F 3/0688* (2013.01); *G06F 3/0689* (2013.01); *G06F 12/10* (2013.01); *G06F 2212/65* (2013.01)

(58) Field of Classification Search
CPC .... G06F 11/10; G06F 11/1044; G06F 11/108; G06F 11/1088; G06F 11/2094; G06F 12/0238; G06F 2211/1059; G06F 2212/214; G06F 2212/222; G06F 2212/313; G06F 2212/7205; G06F 2212/7208
See application file for complete search history.

(56) References Cited

U.S. PATENT DOCUMENTS

2013/0019057 A1* 1/2013 Stephens ............... G06F 11/108
711/103

* cited by examiner

*Primary Examiner* — Yong Choe
(74) *Attorney, Agent, or Firm* — IP & T Group LLP

(57) ABSTRACT

A Discard command is received which includes an address on a specific SSD of a plurality of SSDs configured as a RAID device, wherein the Discard command is associated with data associated with the address. In response to receiving the Discard command, a trim metadata flag is set in an entry associated with the address in a mapping table, wherein a trim metadata flag that is set indicates that a Discard command was received for a corresponding address.

16 Claims, 8 Drawing Sheets

DISCARD COMMAND SUPPORT IN PARITY BASED REDUNDANT ARRAY OF FLASH MEMORY DISK

CROSS REFERENCE TO OTHER APPLICATIONS

This application claims priority to U.S. Provisional Patent Application No. 62/054,890 entitled DISCARD COMMAND SUPPORT IN PARITY BASED REDUNDANT ARRAY OF FLASH MEMORY DISK filed Sep. 24, 2014 which is incorporated herein by reference for all purposes.

BACKGROUND OF THE INVENTION

Redundant array of independent disks (RAID) systems are used to provide disks failover service in storage systems based on generating parity or other forms of error detection and/or correction. RAID was originally designed for magnetic disk storage for example magnetic hard disk drives (HDDs). Recently RAID has also been widely used for flash memory based storage disk such as solid state disks (SSDs) as well.

HDDs and SSDs differ both in underlying technology as well as technical characteristics, including features and performance. There exists a need to fine tune SSD support in RAID to better leverage an SSD's characteristics and technology.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Supporting a Discard command in a RAID system is disclosed. Throughout this specification and without loss of generality a Discard command includes any command that allows a host and/or operating system to identify to an flash memory storage data that is no longer considered in use. Examples of a Discard command include commands associated with a TRIM command in the ATA command set, or an UNMAP command in the SCSI command set. Throughout this specification SSD refers without loss of generality to any flash memory based storage. Throughout this specification and without loss of generality, the terms Discard command, TRIM command, and UNMAP command may be used interchangeably.

The Discard command is designed to extend an SSD's lifetime and to improve its performance. A Discard command for a host device may be translated to an ATA or SCSI command, for example a TRIM command for an ATA SSD. The TRIM command invalidates the mapping between a logical block address (LBA) and a physical block address (PBA).

Figure 1:
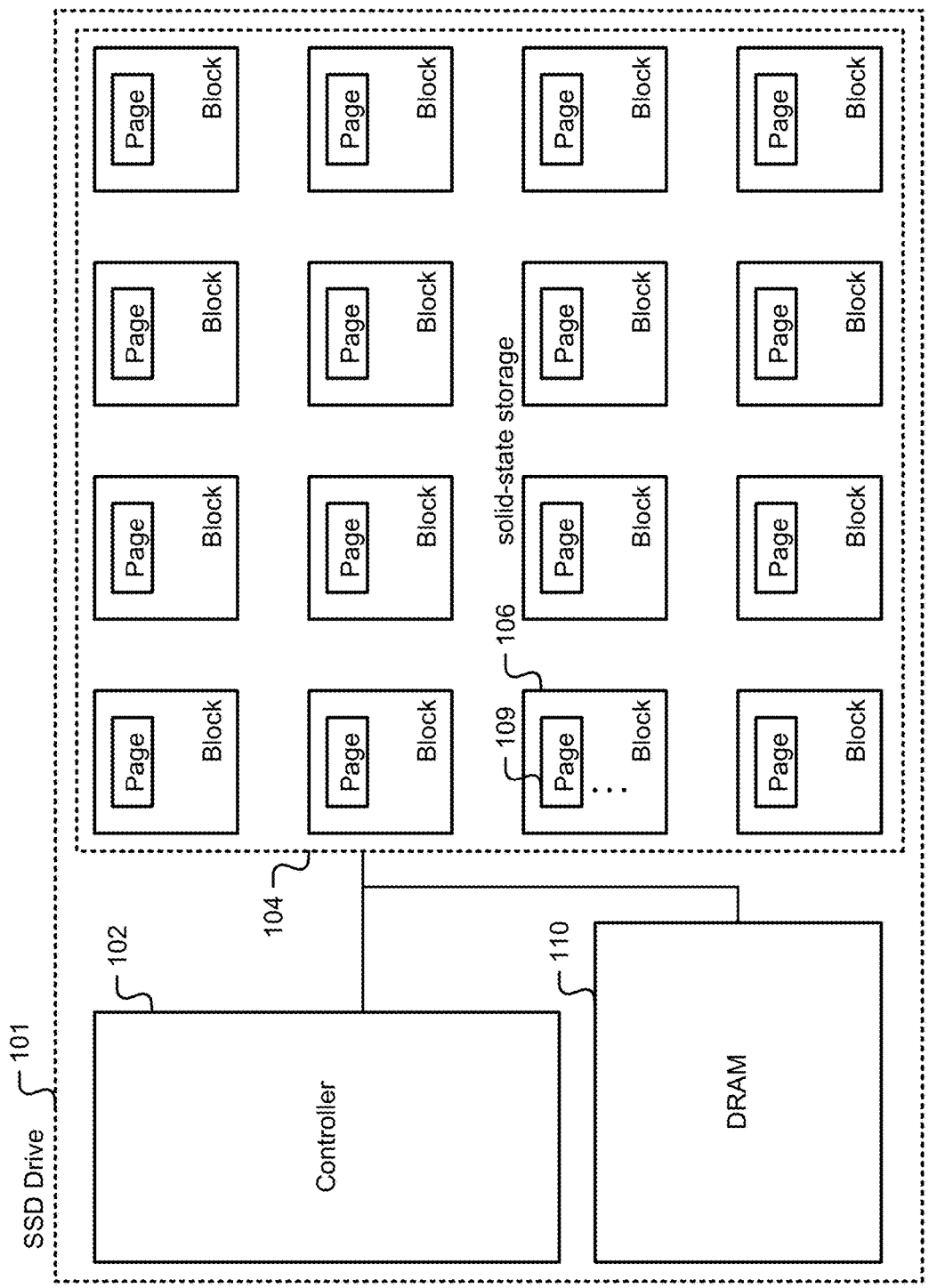
FIG. 1 is an illustration of a NAND flash storage device.

FIG. 1 is an illustration of a NAND flash storage device. A NAND flash storage device like an SSD drive (101) consists of one or more NAND flash chips or dies (104) and a controller chip (102) with its associated DRAM buffer (110). A NAND flash chip is divided into blocks (106), which are subdivided into pages (109). Data can be written to the NAND flash one entire page (109) at a time, and in some cases, a specified fraction of a page at a time. A page (109) must be in an erased state before it can be written. It is not possible to erase individual pages; rather, an entire block (106) must be erased in one shot. A NAND block (106) starts from an erased or empty state; subsequently, it is in the open state as data is written to it; when all the pages are written, the block is said to be in the closed or full state.

Thus SSDs, unlike HDDs, are comprised of pages which can only be directly written to when empty, and all pages in a block must be erased to clear a page back to empty. Writing data to empty pages is very fast, but overwriting data requires a slow cycle of read-erase-modify-write to: i) read existing pages in a block, ii) erase the entire block, iii) modify the block in a buffer, for example removing pages or overwriting data, and iv) writing the buffer back to the now-erased block. Because there are multiple pages in a block, this naturally has a tendency to increase the writes per block. NAND flash have a finite lifetime associated with the number of times they are written, thus a read-erase-modify-write increases wear for the SSD.

The Discard command uses information provided by the host and/or operating system to assist in garbage collection to improve performance and reduce wear. For example if a TRIM command is delivered to one or more LBAs of a SSD, data associated with those LBAs are not guaranteed to be kept in the SSD as time passes because the Flash Translation Layer (FTL) in the SSD may reclaim physical flash memory area and delete all the data. After a TRIM command, zeros may be returned if a host tries to read the discarded LBAs for several different SSD models. Throughout this specification, a "null value" refers to any a priori known returned value whether all zeros, or other bit pattern. Sending Discard commands like the TRIM command to an SSD, can improve both lifetime and performance of the SSD.

RAID systems combine multiple disks into a single logical unit to: i) improve performance, for example by accessing data in parallel (aka striping) over multiple disks; ii) improve reliability, for example by providing parity capacity for error detection and/or correction (EDC); or iii) both improving performance and reliability. Throughout this specification, an illustrative example of RAID 5, block-level striping with distributed parity, is used, but without loss of generality the principles disclosed apply to other RAID levels and/or other EDC schemes, for example RAID 6.

Figure 2:
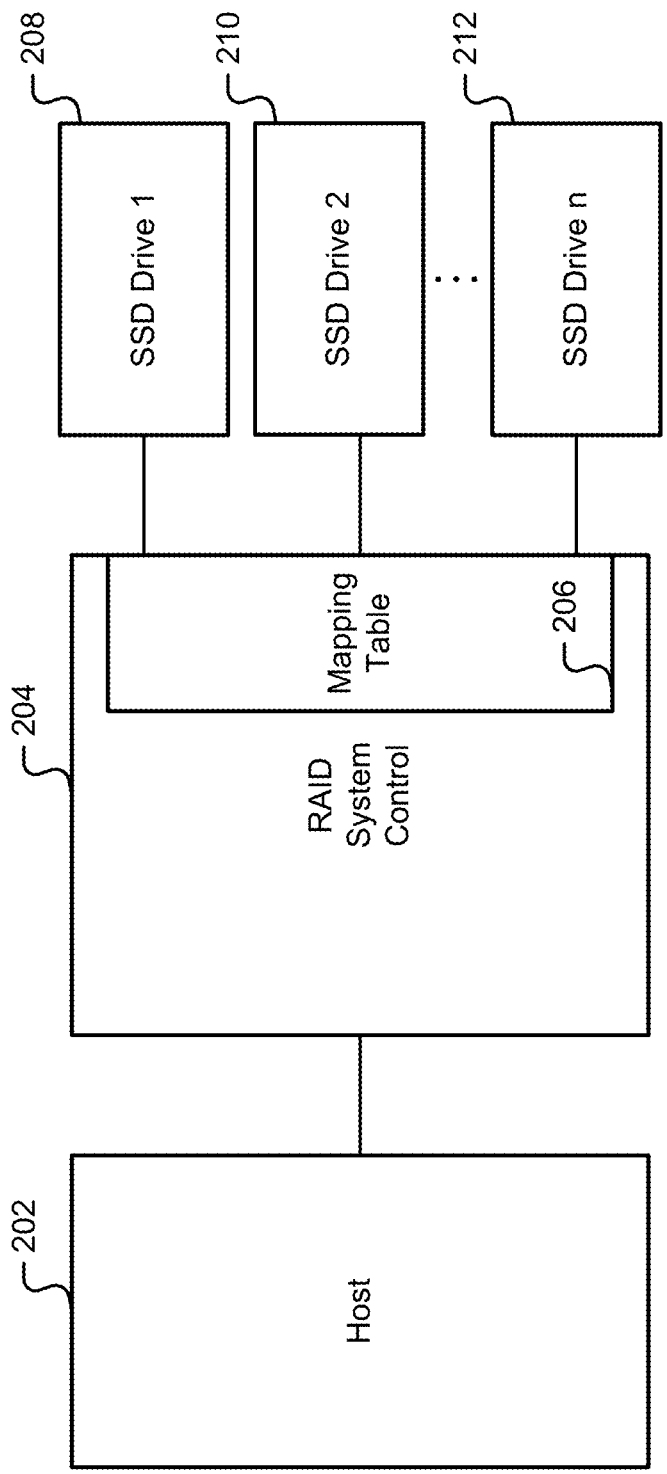
FIG. 2 is a block diagram illustrating RAID control of a plurality of SSDs.

FIG. 2 is a block diagram illustrating RAID control of a plurality of SSDs. Host 202 may be any computer, including a server, client, PC, etc. Host 202 is coupled with RAID system control 204. Throughout this specification, RAID system control is any control over an implementation of RAID including, and without limitation, a hardware RAID device, a software RAID device, and so forth. Typically a RAID device is visible as a single block device to higher service layer software. Each RAID address is an address a host software uses to access data from the RAID device.

Without loss of generality the principles disclosed apply to hardware and/or software RAID. The RAID system and control (204) is coupled to a plurality of SSD drives, here shown to be three: SSD drive 1 (208), SSD drive 2 (210), and SSD drive 'n' (212). Without loss of generality, the principles disclosed apply to any number of SSD drives in the RAID system. RAID system control includes a mapping table 206 that maps addresses between the RAID device represented to the host (202), and the various SSD drives (208), (210), . . . (212).

In one embodiment, the RAID system control (204) includes a software RAID controller including an operating system and/or existing RAID device driver with a patch software. Examples of a RAID device driver include and in the Linux operating system, RAIDframe in the NetBSD operating system, GEOM in the FreeBSD operating system, softraid in the OpenBSD operating system, or Disk Management in the Windows operating system. Throughout this specification "patch software" refers without loss of generality refers to any addendum software including source code patches for compile-time patching, or software objects/modules/extensions/plug-ins for run-time integration with the existing RAID device driver.

Thus, traditional parity based RAID device and/or implementations (204) may not be able to validly deliver a Discard command to an SSD (for example, 208) because when the SSD (208) discards data for its corresponding LBAs, the parity data may become incorrect and/or invalid. Due to the nature of many parity algorithms, for example XOR based algorithms, during reconstruction and/or recovery, data is required on one or more of the drives to be valid. In many RAID configurations the parity data is saved in another SSD.

Figure 3:
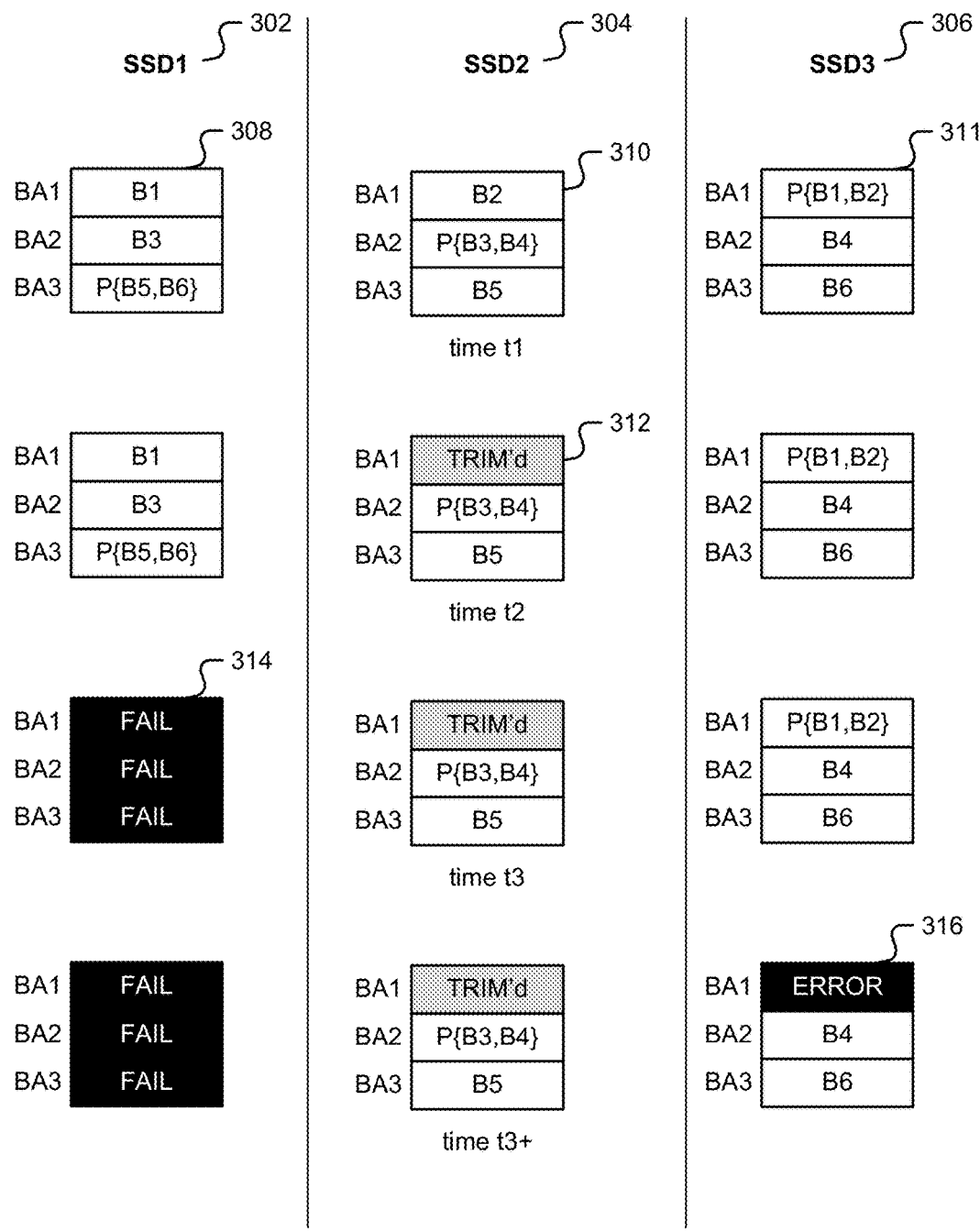
FIG. 3 is an illustrative example of how parity data becomes invalid if a traditional RAID uses a Discard command.

FIG. 3 is an illustrative example of how parity data becomes invalid if a traditional RAID uses a Discard command. Without loss of generality, a three SSD RAID 5 system is illustrated. SSD1 (302), SSD2 (304), and SSD3 (306) are shown, each representing a column, over time as expressed in rows.

Throughout this specification, a "RAID LBA" refers to any address in the address space of the RAID device controlled by RAID control (204), whereas an "SSD LBA" or generic "LBA" may refer to any address in the address space of an SSD (208)-(212). In the first row at time t1, the first three SSD block addresses, BA1 through BA3, are shown for each of the SSDs (302)-(306). At time t1, for SSD1 (302), block address BA1 is associated with data associated with the RAID device at RAID address B1 (308). Similarly, at time t1, for SSD2 (304), block address BA1 is associated with data associated with the RAID device at RAID address B2 (310). Thus, at time t1, parity is calculated across the SSD's respective BA1 and stored in BA1 for SSD3 (306), depicted in FIG. 3 as "P{B1,B2}" meaning parity calculated as a function of the data in RAID addresses B1 and B2.

At time t2, the RAID controller (204) naively sends a TRIM command to SSD2 (304), resulting in the data associated with BA1 being TRIM'd, and shown now in grey (312). Unlike HDDs, a read from a TRIM'd data (312) may return all zeros.

At time t3, SSD1(302) fails, so that all blocks do not return valid data including that associated with BA1 (314). Thus after time t3, depicted as time t3+ in FIG. 3, the parity data in SSD3 (306) at BA1 will now be in error (316), since it can only read zeroes from SSD2 (304) at BA1, and may not be able to reconstruct RAID address B1.

There has been a proposal to deliver a Discard command to an SSD in the storage community. This proposal involved issuing a TRIM command to an SSD and recalculating parity data and writing the parity data to the parity SSD under the assumption that a TRIM'd LBA would return all zeros in a subsequent read operation.

Figure 4:
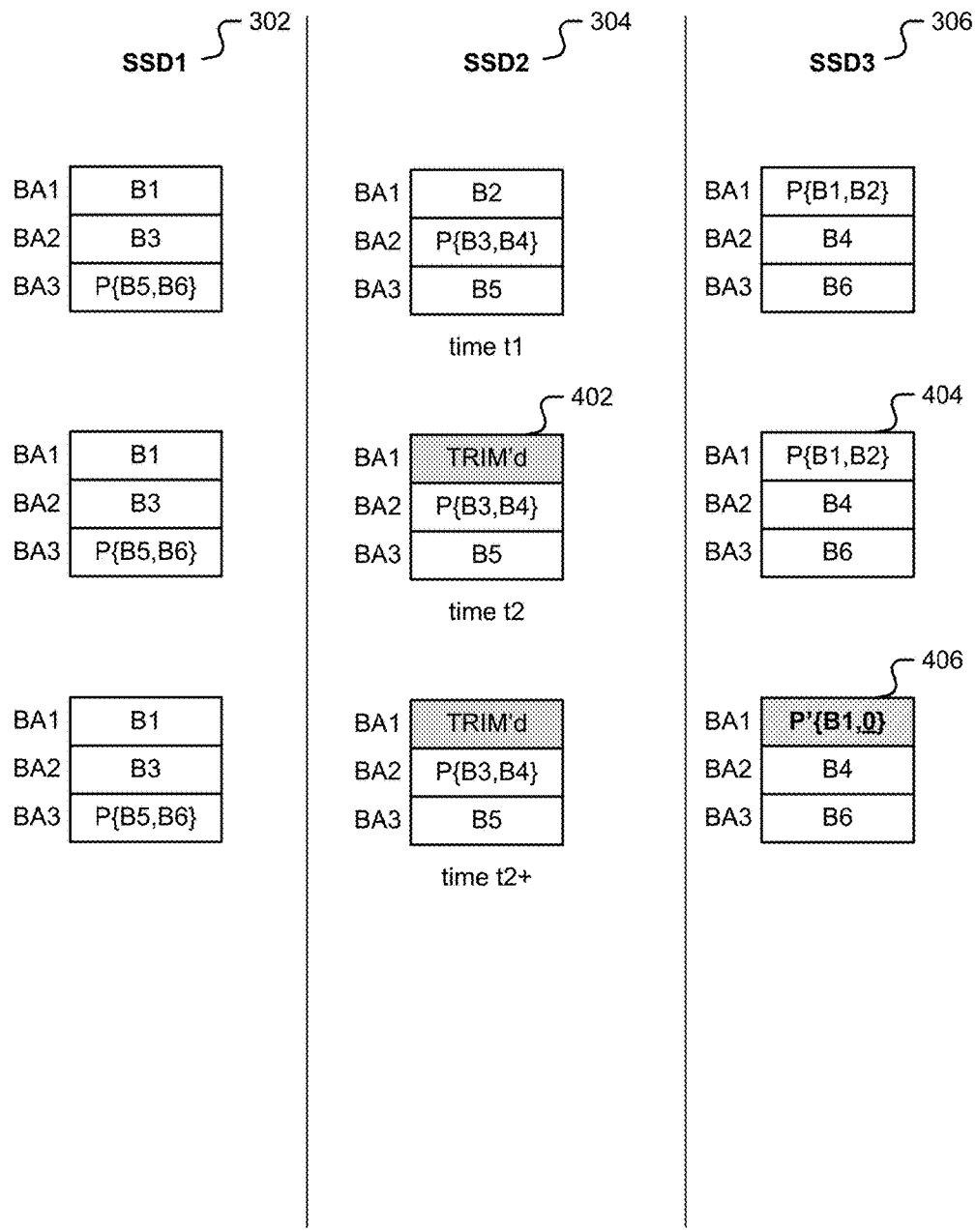
FIG. 4 is an illustrative example of the proposal to use a Discard command with an SSD RAID.

FIG. 4 is an illustrative example of the proposal to use a Discard command with an SSD RAID.

At time t1, SSD1 (302), SSD2 (304), and SSD3 (306) all have the same contents for BA1 as at time t1 in FIG. 3.

At time t2, the RAID controller (204) sends a TRIM command to SSD2 (304), resulting in the data associated with BA1 being TRIM'd, and shown now in grey (402).

Right after time t2, the RAID controller (204) recalculates parity data based on an assumption that the TRIM'd BA1 (402) would return all zeros, and must rewrite the parity based on this to BA1 of SSD3 (306), depicted as parity data (406) P' {B1,0} to show the replacement of RAID address B2 with all zeros.

Note that this proposal causes an extra write operation to the parity SSD (306), which reduces the lifetime and hampers performance of the parity SSD (306). Due at least in part to these limitations, this proposal has not been widely pursued, and an alternate technique is disclosed here.

Write to Discard block technique. A "write-to-Discard" algorithm is disclosed. This algorithm solves the problem of supporting the Discard command in parity based SSD RAIDs and is enabled based on the following assumptions and/or observations:

There are often pending new write I/O requests coming for the RAID device after a particular Discard command; and
When an LBA receives a Discard command, writing the pending new data to the same LBA effectively generates the same resource burden overall across all the SSDs, even without executing the actual Discard command.

In the "write-to-Discard" algorithm, the original RAID controller (204) attempts to write new data to SSD LBAs that have received a Discard command earlier. By writing new data to those SSD LBAs, the flash memory area used to save the previous data can be reclaimed using the SSD's internal FTL-based garbage collection. This is effectively same as the SSD actually receiving a Discard command, without actually invoking the Discard command and reducing the data to all-zeros.

Figure 5A:
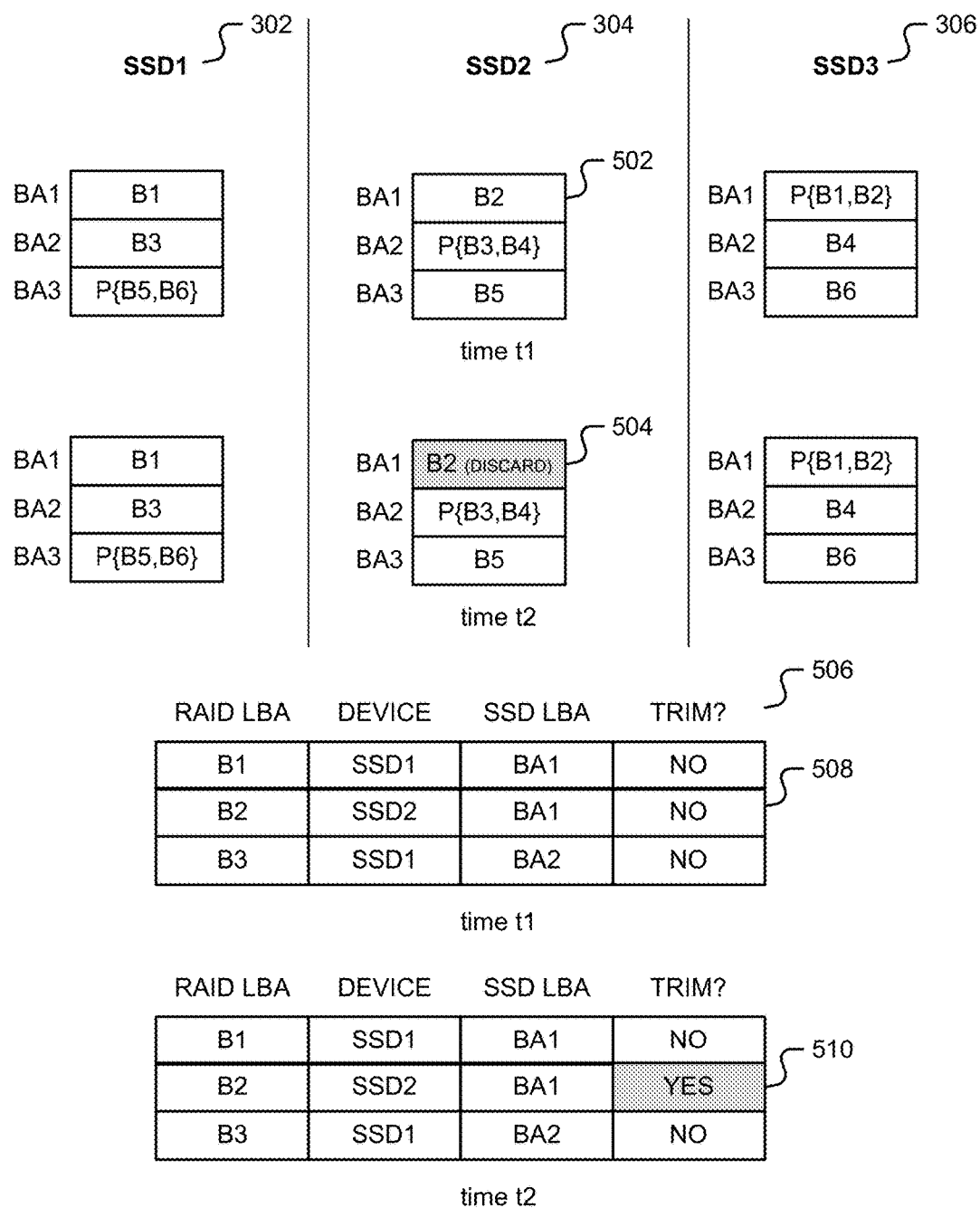
FIGS. 5A and 5B illustrate an example of the write-to-Discard technique.
Figure 5B:
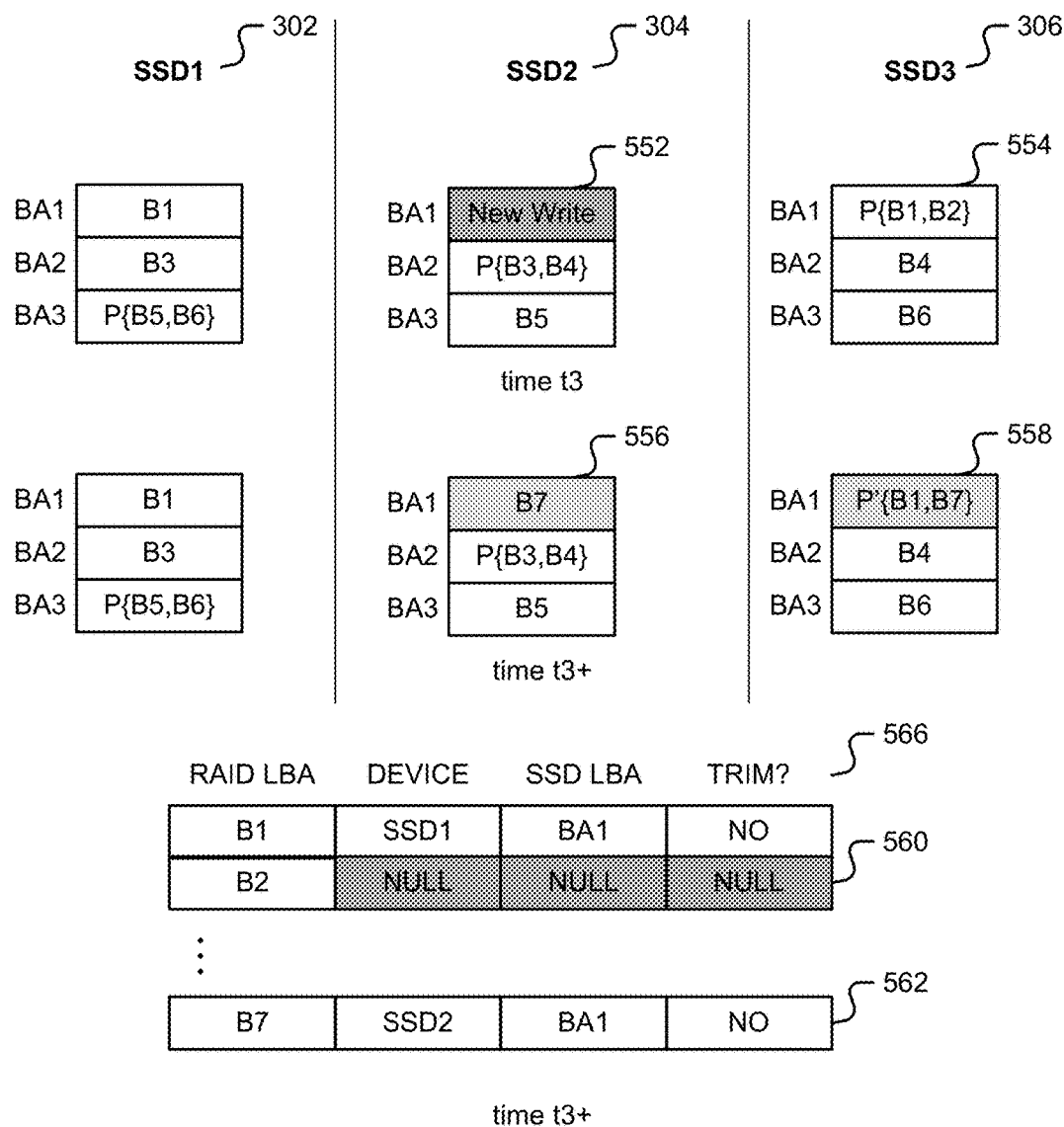

FIGS. 5A and 5B illustrate an example of the write-to-Discard technique. In the top half of FIG. 5A, the contents of SSD1 (302), SSD2 (304), and SSD3 (306) are shown, each representing a column, over time as expressed in rows, time t1 and time t2. In the bottom half of FIG. 5B, the contents of the (204) RAID controller's mapping table (206) is shown for the same times t1 and t2. In the top half of FIG. 5B, the contents of SSD1 (302), SSD2 (304), and SSD3 (306) are shown, each representing a column, over time as expressed in rows, time t3 and immediately thereafter, time t3+. In the bottom half of FIG. 5B, the contents of the (204) RAID controller's mapping table (206) is shown for time t3.

At time t1, SSD2(304) has RAID address B2 (502) associated with SSD2's BA1 address. The corresponding mapping table (506) at time t1 shows that for the RAID address B2, on device SSD2, the SSD address BA1 is current not a trimmed address (508) using a metadata flag. Without limitation, the techniques disclosed may use a TRIM metadata bit, metadata flag, or any other metadata/apparatus to associated with a row in the mapping table (506).

At time t2, the RAID controller (204) sends a TRIM command to SSD2 (304) for BA1 (504). Note that with the write-to-Discard technique, no change is made to the data (504), and the SSD2 (304) is filtered from receiving a Discard command of any type. Throughout this specification, the term 'filter' in this context refers to any filtering, omitting, muting, suppressing and/or otherwise silencing a Discard command (including TRIM and UNSET) from being issued to the SSD, at compile-time, run-time, and/or any other time. For example, a patch software may filter a Discard command where a hypothetical second patch software based on FIGS. 3 and/or 4 may transmit a Discard command to an SSD. The corresponding mapping table (508) at time t2 shows the same row, with the exception that the TRIM metadata flag is now set (510).

After time t2 but before time t3, because SSD2 (304) never received an actual TRIM command, the parity calculation P{B1,B2} is still valid and can tolerate faults on any one of the SSDs (302)-(306).

At time t3, the RAID controller (204) receives a new write request and plans to route it to SSD2 (304) at address BA1 (552). At time t3+ immediately after time t3, the RAID controller writes to SSD2 (304) address BA1 the RAID LBA B7 (556), and writes to parity SSD3 (306) the updated parity data P' {B1, B7} based on B1 and B7 (558). Similarly, for the mapping table (506), the row associated with RAID address B2 is cleared or at least no longer referenced (560), and the row associated with RAID address B7 is updated with SSD2-BA1 and intialized with the TRIM metadata flag cleared (562).

Figure 6:
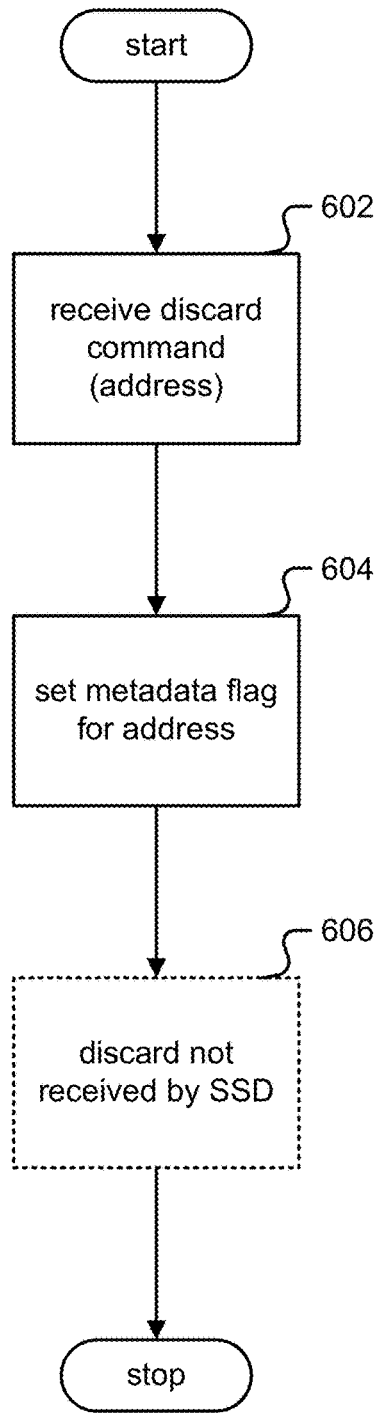
FIG. 6 is a block diagram illustrating an embodiment for Discard command support in SSD RAID.

FIG. 6 is a block diagram illustrating an embodiment for Discard command support in SSD RAID. In one embodiment the technique of FIG. 6 is performed by RAID control (204) in FIG. 2.

In step 602, a Discard command for an SSD is received. In one embodiment, the Discard command is received from an existing algorithm, routine, and/or object in the RAID controller. In one embodiment, the Discard command is not received or mentioned at all (for example with a RAID controller designed for HDDs) but would be hypothetically received if the RAID controller was adapted for SSDs as shown for example in FIGS. 3 and/or 4. In one embodiment, the Discard command is merely a variable, memory location, metadata, etc. to indicate a Discard command would hypothetically be sent to the SSD using the techniques shown in FIGS. 3 and/or 4. The Discard command will include an address on a specific SSD (210) (304) of the plurality of SSDs associated with the SSD RAID, wherein the Discard command is associated with data associated with the address. For example, this step is shown at time t2 (504) in FIG. 5A by the appearance of support of a Discard command for BA1 for SSD2 (304).

In step 604, a metadata flag is set for the address. In one embodiment this metadata flag is a column in a mapping table (206). That is, in response to receiving the Discard command, a TRIM metadata flag is set in an entry associated with the address in a mapping table, wherein the TRIM metadata flag that is set indicates that a Discard command was received for the corresponding address. A TRIM metadata flag may also be known as a Discard metadata flag or UNSET metadata flag. For example, this step is shown at time t2 (510) in FIG. 5A.

In step 606, shown with a dotted line to emphasize that it may be implicit, is that the Discard command, TRIM command, and/or UNSET command is not received by the specific SSD. In one embodiment where a RAID controller (204) has already been adapted for SSDs, for example using the techniques shown in FIGS. 3 and/or 4, this may include filtering the command from the SSD. In one embodiment where a RAID controller has not already been adapted for SSDs, it may include filtering the command from the SSD from where it hypothetically would occur as for example shown in FIGS. 3 and/or 4; for example when writing the software source code.

Thus, a parity data based at least in part on data associated with the address associated with the Discard command (for example B2 at time t2 in FIG. 5A) is kept without updating.

Figure 7:
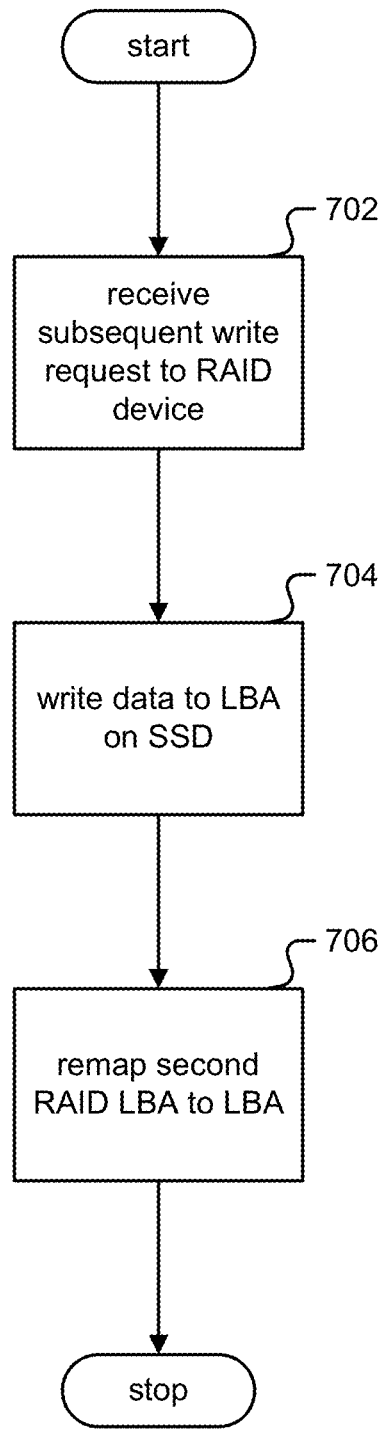
FIG. 7 is a block diagram illustrating an embodiment for a write-on-Discard technique in SSD RAID.

FIG. 7 is a block diagram illustrating an embodiment of a write-on-Discard technique in SSD RAID. In one embodiment the technique of FIG. 7 is performed by RAID controller (204) in FIG. 2 and performed on or after step 604 of FIG. 6.

In step 702, a subsequent write request for data is received for the RAID device with RAID control (204). An example of this in FIG. 5B is that at time t3 (552).

In step 704, the data is written to an LBA on the SSD with the TRIM metadata flag set. To continue the example, the LBA with TRIM metadata flag set is shown at time t2 (510) in FIG. 5A, and the data is written at time t3 (552) with the result at time t3+ (556). At time t3+ the parity may also be recalculated (558).

In one embodiment, after writing the data, an FTL garbage collection system reclaims data associated with the LBA in the event of a subsequent write request.

In step 706, a second RAID LBA is remapped to the LBA on the SSD. To continue the example, the first RAID LBA is B2 and the second RAID LBA is B7 for SSD2 (304)'s LBA BA1, wherein B2 is no longer associated with BA1 (560), and B7 is remapped to BA1 (562).

In one embodiment, after remapping, a parity data is updated previously based at least in part on data associated with the first RAID LBA to be instead based at least in part on data associated with the second RAID LBA. For example as shown in FIGS. 5A/5B, the parity for BA1 in SSD3 (306) starts with P{B1,B2} based in part on first RAID LBA B2, and is updated to P' {B1,B7} based on second RAID LBA B7.

In one embodiment, a second TRIM metadata flag is initialized as 'clear' for a second entry for the second RAID LBA in the mapping table. To continue the above example, the entry for B7 does not have a TRIM metadata flag set (562). In one embodiment, a null value is returned for subsequent reads to the first RAID LBA (560).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a plurality of SSDs (solid state drives), wherein the plurality of SSDs are configured as a RAID (redundant array of inexpensive drives) device;
a processor coupled with the plurality of SSDs; and
a memory coupled with the processor, wherein the memory is configured to provide the processor with instructions which when executed cause the processor to:
receive a Discard command which includes an address on a specific SSD of the plurality of SSDs, wherein the Discard command is associated with data associated with the address;
in response to receiving the Discard command, set a trim metadata flag in an entry associated with the address in a mapping table, wherein the trim metadata flag that is set indicates that the Discard command is received for the corresponding address;
map a logical block address (LBA) of the specific SSD with a first RAID LBA of the RAID device via the mapping table;
receive a subsequent write request for new data to the RAID device with a RAID controller, wherein the RAID controller writes the new data to the LBA on the specific SSD with the TRIM metadata flag; and
remap a second RAID LBA to the LBA on the specific SSD.

2. The system of claim 1, wherein the processor is further configured to filter the Discard command from being received by the specific SSD.

3. The system of claim 1, wherein the address on the specific SSD is a logical block address (LBA).

4. The system of claim 3, further comprising an FTL (flash translation layer) garbage collection reclaiming data associated with the LBA in the event of a subsequent write request.

5. The system of claim 1, wherein the processor is further configured to:
after remapping, update a parity data previously based at least in part on data associated with the first RAID LBA to be instead based at least in part on data associated with the second RAID LBA.

6. The system of claim 5, wherein the processor is further configured to:
clear a second TRIM metadata flag for a second entry for the second RAID LBA in the mapping table.

7. The system of claim 1, wherein the processor is further configured to return a null value for subsequent reads to the first RAID LBA.

8. The system of claim 1, wherein the RAID device is visible as a single block device to higher service layer software.

9. The system of claim 1, wherein the RAID device includes a plurality of RAID addresses, each of the RAID addresses is an address used by a host software to access data from the RAID device.

10. The system of claim 1, wherein the RAID device is a RAID level 5 device.

11. The system of claim 1, further comprising a parity data based at least in part on data associated with the address associated with the Discard command and kept without updating.

12. A method, comprising:
receiving a Discard command which includes an address on a specific SSD of a plurality of SSDs configured as a RAID device, wherein the Discard command is associated with data associated with the address;
in response to receiving the Discard command, setting a trim metadata flag in an entry associated with the address in a mapping table, wherein the trim metadata flag that is set indicates that the Discard command is received for the corresponding address;
mapping a logical block address (LBA) of the specific SSD with a first RAID LBA of the RAID device via the mapping table;
receiving a subsequent write request for new data to the RAID device with a RAID controller, wherein the RAID controller writes the new data to the LBA on the specific SSD with the TRIM metadata flag; and
remapping a second RAID LBA to the LBA on the specific SSD.

13. The method of claim 12, further comprising filtering the Discard command from being received by the specific SSD.

14. The method of claim 12, wherein the address on the specific SSD is an LBA.

15. A computer program product, the computer program product being embodied in non-transitory computer readable storage medium and comprising computer instructions for:
receiving a Discard command which includes an address on a specific SSD of a plurality of SSDs configured as a RAID device, wherein the Discard command is associated with data associated with the address;
in response to receiving the Discard command, setting a trim metadata flag in an entry associated with the address in a mapping table, wherein the trim metadata flag that is set indicates that the Discard command is received for the corresponding address;
mapping a logical block address (LBA) of the specific SSD with a first RAID LBA of the RAID device via the mapping table;
receiving a subsequent write request for new data to the RAID device with a RAID controller, wherein the RAID controller writes the new data to the LBA on the specific SSD with the TRIM metadata flag; and
remapping a second RAID LBA to the LBA on the specific SSD.

16. The computer program product of claim 15, further comprising computer instructions for filtering the Discard command from being received by the specific SSD.

* * * * *